(12) United States Patent
Morooka et al.

(10) Patent No.: US 6,310,456 B1
(45) Date of Patent: Oct. 30, 2001

(54) CONTROL SYSTEM AND METHOD

(75) Inventors: Yasuo Morooka; Hiromi Inaba; Takashi Nakahara; Takashi Okada; Masahiro Tobise; Yoshitaka Iwaji, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/446,849

(22) PCT Filed: Apr. 19, 1999

(86) PCT No.: PCT/JP99/02071

§ 371 Date: Dec. 28, 1999

§ 102(e) Date: Dec. 28, 1999

(87) PCT Pub. No.: WO99/56185

PCT Pub. Date: Nov. 4, 1999

(30) Foreign Application Priority Data

Apr. 24, 1998 (JP) .................................................. 10-114591

(51) Int. Cl.[7] .................................................. G05B 19/408
(52) U.S. Cl. .................... 318/568.22; 318/561; 318/623; 318/629; 318/432; 318/433; 318/434; 318/611; 318/619
(58) Field of Search .................................... 318/561, 623, 318/629, 432, 611, 619, 433, 434, 568.22

(56) References Cited

U.S. PATENT DOCUMENTS 4,876,494 * 10/1989 Daggett et al. .................. 318/568.22
6,051,941 * 4/2000 Sudhoff et al. ....................... 318/140
6,107,767 * 8/2000 Lu et al. ............................... 318/561

FOREIGN PATENT DOCUMENTS

| 59-149505 | 8/1984 | (JP) . |
| 61-020102 | 1/1986 | (JP) . |
| 3-110605 | 5/1991 | (JP) . |
| 6-067703 | 3/1994 | (JP) . |
| 6-214610 | 8/1994 | (JP) . |
| 8-083103 | 3/1996 | (JP) . |

* cited by examiner

Primary Examiner—Karen Masih
(74) Attorney, Agent, or Firm—Kenyon & Kenyon

(57) ABSTRACT

A control system for determining a control function for a control device on the basis of a transfer function of an object to be controlled and for adjusting an operation quantity of an object to be controlled in accordance with the determined control operation function, wherein an control function of a first control device is determined so that a closed-loop transfer function of a control system including the object to be controlled and the first control device coincides with a predetermined first transfer function, an control function of a second control device is determined, in a closed loop control system including the control system and the first control device, so that a transfer function from a disturbance applied to the object to be controlled to a state variable of a point at which the disturbance is applied to the object to be controlled, and a sum signal indicative of a sum of outputs of the first and second control devices is used as an operation quantity of the object to be controlled.

16 Claims, 5 Drawing Sheets

CONTROL SYSTEM AND METHOD

TECHNICAL FIELD

The present invention relates to a novel method for designing a control system and to a control device and method therefor and more particularly, to a control system and method which is suitably used for motion control. The present invention also relates to a control system which can be valid for motor speed control and roll-gap position control of a rolling mill or the like, and can perform load following control concurrently with target-value following control to eliminate an impact drop caused by an abrupt change in a load and to realize such accurate control as to cause substantially no generation of a control deviation.

BACKGROUND ART

Various methods have conventionally been proposed as a control system design method and a theoretical system thereof has been already established. In the design based on the classical control theory, however, its target is directed to a control system having one input and one output so that, in order to control a plurality of states at the same time, a control device relating to the most inner state is designed for each state, a control device for the outer loop is designed outside of the most inner state, and so on. That is, there has been employed a multi-looped control system configuration. More specifically, when targets to be controlled are Gp1 and Gp2 as shown in FIG. 3, a control device Gc2 is first designed for the control target Gp1, the control device Gc2 is then designed for a loop system of the control target Gp1 and a control device Gc1 and for a control system of the control target Gp2, and an output thereof is given as a target value of the control device Gc1. Similarly, when there is an outer loop not illustrated, a control device Gc3 is designed for an object Gp3 to be controlled, an output thereof is given as a target value of the control device Gc2, and so on. In this way, design is carried out sequentially from an innermost system to an outer system to form a multiple loop configuration.

It is well known in such a control method that, if an inner control system does not have a response higher than an outer control system, then stable suitable control cannot be realized. Further, an outer control loop depends on an inner control loop, and has a response delayed with respect to the outer control loop.

Further, in a recent control theory, n control devices are designed at one time based on matrix calculation upon designing control devices for a multiplicity of state variables, but physical phenomenon relationships between the control devices and state quantities to be controlled become unclear, leading to the fact that the control system cannot be easily adjusted.

DISCLOSURE OF INVENTION

It is an object of the present invention to provide a control system which can remove restrictions of response performances of a plurality of control systems, and can clarify physical phenomenon relationships between the individual control devices and state variables of objects to be controlled for easy adjustment, by providing predetermined response functions determined by a designer for the plural control systems with respect to the objects to be controlled and by designing the control devices for the respective control systems.

In accordance with the present invention, a control device for each of subsystems is sequentially designed so that a frequency response of a control system to be controlled becomes a predetermined control response, and so that outputs of the control devices are added to be used as an operation input to the object to be controlled. That is, the i-th control device is designed so that the response of the i-th control system becomes a predetermined response function from the control devices until (i−1)-th control device already designed so far and the object to be controlled, and the outputs of the n control devices are added to be used as the input operation quantity of the object to be controlled.

Further, suppression control for a disturbance is carried out in a part of the control devices.

In addition, since a control input signal contains a noise signal of a detector and electrical noise applied to a signal cable, presence of a differentiating operation in control operation or calculation may cause the control system to be made unstable under the influence of such various noises as mentioned above. To avoid such a problem, in accordance with the present invention, the control calculation is converted to a state valuable to be differentiated and a state valuable having a differential relationship therewith, which are converted to different calculation loops, so that the control calculations or operations of all the control devices can include only proportional and integral elements and n-order delay elements such as 1- and 2-order delay elements.

In accordance with the present invention, a first control device performs control of following a state of a final object to be controlled to a target value, a second control device performs control over a load disturbance to be applied to a control system to thereby stabilized the control system. Further, even if there is an disturbance variable in a control system to be controlled, there is a state valuable which is to be controlled to be a predetermined value in an upper system of the control system, in which case a third control device is added by separating the function of the second control device therefrom.

BEST MODE FOR CARRYING OUT THE INVENTION

Explanation will first be made as to how to design a basic control device in accordance with the present invention with use of FIG. 1.

Figure 1:
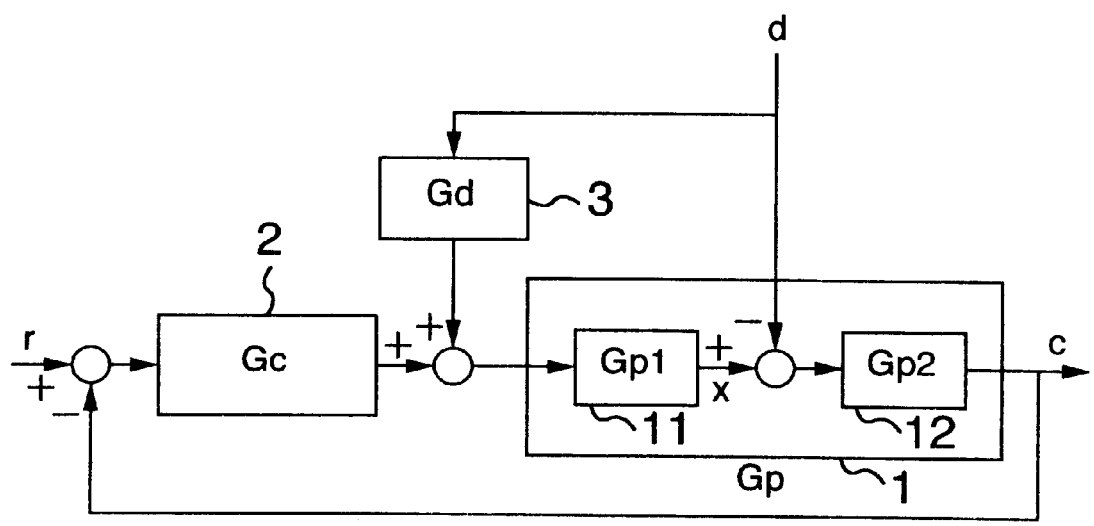
FIG. 1 is a block diagram of a basic control system to be controlled in accordance with the present invention, showing a relationship between objects to be controlled and control devices.

In FIG. 1, symbol Gp denotes a transfer function of an object to be controlled, and symbols Gp1 shown in a block 11 and Gp2 shown in a block 12 denote partial transfer functions respectively. That is, an equation which follows is satisfied.

[Equation 1]

$$Gp=Gp1\ Gp2 \qquad (\text{Equation 1})$$

Symbol r denotes a target value and c denotes a control quantity. Symbol d denotes a disturbance. Symbol Gc denotes a first control device Gc for controlling the control quantity c, and Gd denotes a second control device for suppressing the disturbance. In the present invention, the first control device Gc is designed so that a closed-loop transfer function of the control system from the target value r to the control quantity c becomes a predetermined response function. For example, when the predetermined response function of the closed-loop transfer function is denoted by Ga, an equation which follows is satisfied.

[Equation 2]

$$Gp \cdot Gc/(1+Gp \cdot Gc)=Ga \qquad (\text{Equation 2})$$

From the above equation, the control operation of the first control device Gc is given by the following equation (3).

[Equation 3]

$$Gc=Ga/(Gp \cdot (1-Ga)) \qquad (\text{Equation 3})$$

Figure 2:
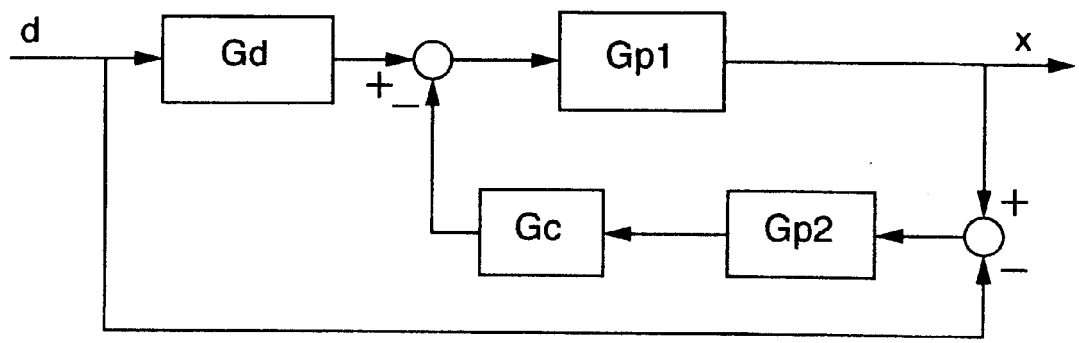
FIG. 2 is a conversion of FIG. 1 for explaining how to design a second control device in the present invention.

Next the second control device Gd is intended to be operated so that an output of the partial transfer function Gp1 of the object to be controlled receiving the disturbance follows the disturbance d. The control system and a block diagram from the disturbance d to the output x in FIG. 1 are written as shown in FIG. 2. In this case, the transfer function Gd of the second control device is found so that a transfer function from the disturbance d to the output x becomes equal to a predetermined transfer function Gb which satisfies the following equation 4.

[Equation 4]

$$(Gd \cdot Gp1+Gp1 \cdot Gp2 \cdot Gc)/(1+Gp1 \cdot Gp2Gc)=Gb \qquad (\text{Equation 4})$$

In this case, Gp1·Gp2=Gp. Thus the control operation transfer function Gd of the second control device is found as follows.

[Equation 5]

$$Gd=Gb/Gp1+(Gb-1) \cdot Gb2Gc \qquad (\text{Equation 5})$$

Gc in the equation (3) and Gd in the equation (5) are set in the control device of FIG. 1.

Figure 3:
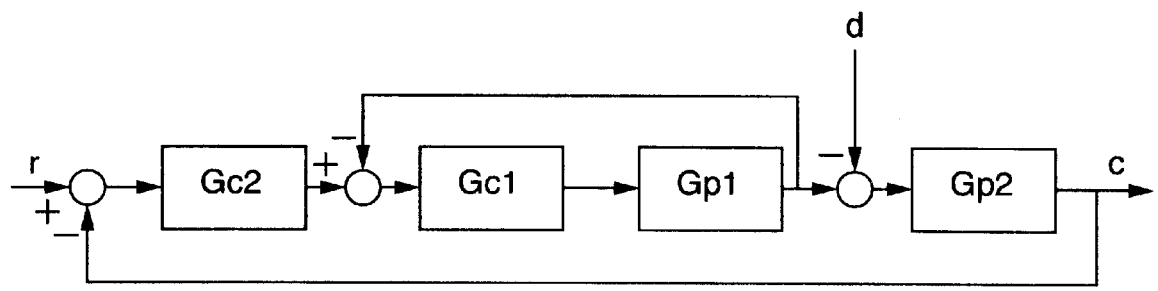
FIG. 3 is a prior art example associated with the present invention.

In the conventional control system, such a control device of a series connection configuration as shown in FIG. 3 is employed, but it is difficult to design G1 and G2 based on the aforementioned design principle of the present invention.

Detailed explanation will be made in connection with an example in which the present invention is applied to motor control of a rolling mill.

Figure 4:
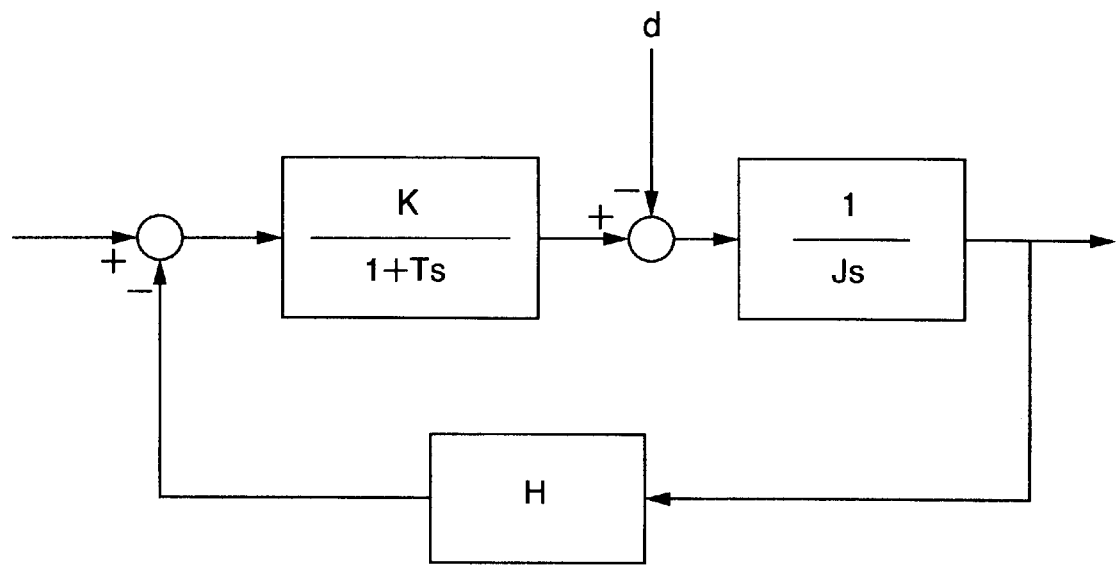
FIG. 4 is a block diagram of a motor to be controlled as a typical control object of the present invention.

FIG. 4 is a generally-well known block diagram of a motor to be controlled. When the block diagram of FIG. 4 is compared with the block diagram of the object to be controlled shown in FIGS. 1 and 2, there is a feedback loop based on a counter electromotive force of the motor in FIG. 4, and the transfer function Gp of the object to be controlled is expressed as follows.

[Equation 6]

$$Gp=K/(Js(Ts+1)+KH) \qquad (\text{Equation 6})$$

Figure 5:
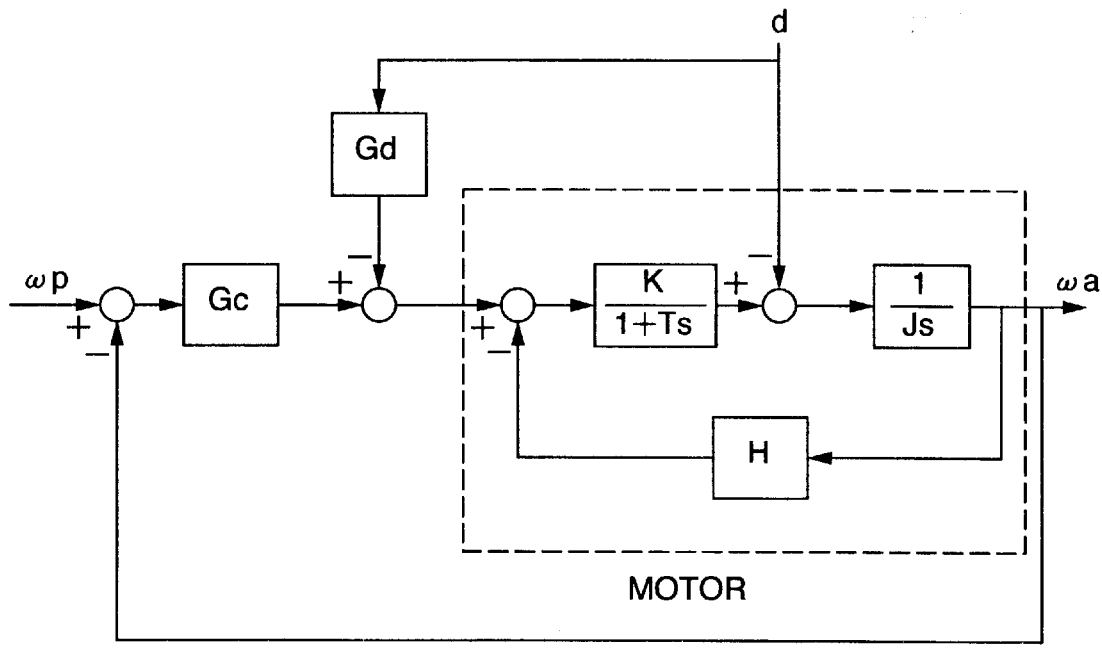
FIG. 5 is an embodiment of the present invention for motor control.

When it is desired to perform speed control and load torque control over the motor, its block diagram is as shown in FIG. 5, in which Gc denotes a speed control device, Gd denotes a load torque control device, and a motor terminal voltage is an operation quantity.

Now when the speed control device Gc is designed so that a response transfer function from a speed target value ωp to a motor angular speed ωa satisfies the following equation (7), the equation (8) is obtained by applying it to the equation (3).

[Equation 7]

$$Ga=1/(Tas+1) \qquad (\text{Equation 7})$$

$$Gc = Ga/(Gp \cdot (1-Ga)) \qquad (\text{Equation 8})$$

$$= (Js(Ts+1) + KH)/(KTas)$$

$$= J/(Kta) + H/(Tas) + JTs/(Kta)$$

Next, in the equation (5), when Gp1 is substituted for K/(Ts+1), Gp2 is substituted for 1/Js and Gc is substituted for (H+Gc), the block diagram is converted to the same block diagram as FIGS. 5 and 2.

Accordingly, when the predetermined response transfer function is expressed by 1/(Tbs+1), the control operation transfer function Gd for the load torque control is expressed as follows.

[Equation 9]

$$Gd=Gb/Gp1+(Gb-1) \cdot Gp2 \cdot (H+Gc)=(Ts+1)/(K \cdot (Tbs+1))-Tb(H+Gc)/((Tbs+1)J) \qquad (\text{Equation 9})$$

In the equation (9), Gc is the operation transfer function given in the equation (8).

Although the above control operation has been applied to the motor drive control in accordance with the principle of the present invention, another control operation including a differentiation term exits as seen from the third term in the equation (8). Usual motor control has had a problem that pulses called "ripples" are contained in the speed and current, so that presence of such a differentiation term causes the control not to be stabilized, whereby control gain cannot be made large. In order to solve this respect, the present invention is featured in that, when control is carried out based on the operation of the equation (8) for example, from the fact that its input is a difference between target and actual values of the motor speed and paying attention to the block diagram of the motor of FIG. 4 as an object to be controlled, differentiation of the speed (that is, the third term in the equation (8)) means conversion to load and motor generation torques (proportional to the motor current). That is, this is expressed as follows.

[Equation 10]

$$JTs/(KTa)*(\omega p-\omega a)=JTs/Kta*\omega p-T/Kta*(-d+x) \quad \text{(Equation 10)}$$

Figure 6:
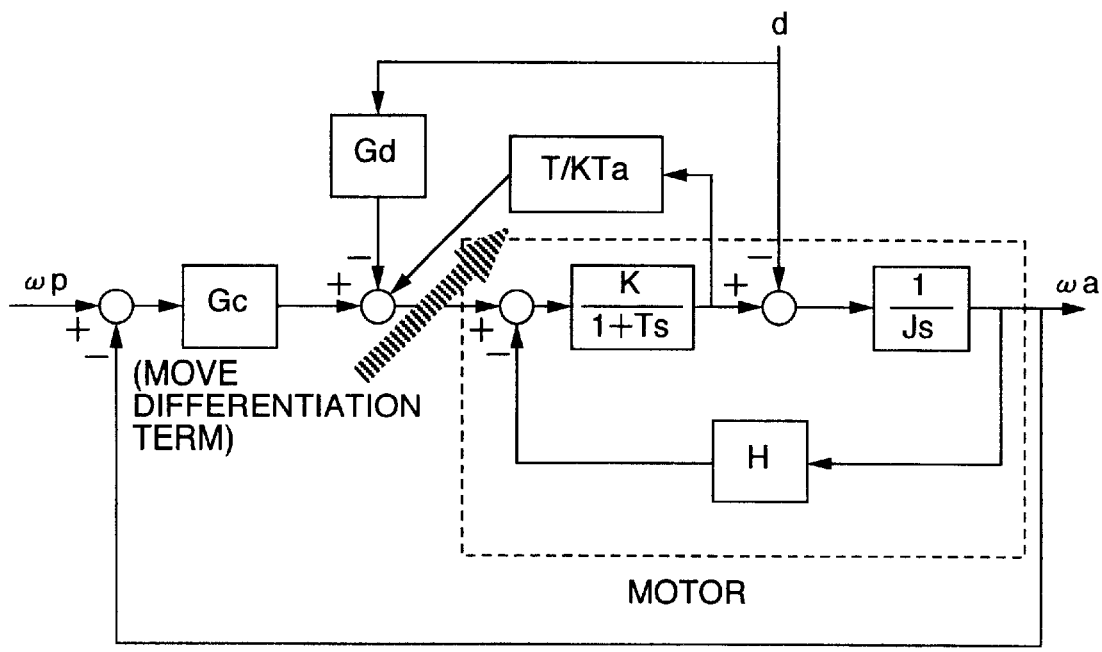
FIG. 6 is a modification example (with a differentiation term removed) of the control of FIG. 5.

In the above equation, the disturbance d in the second term is included in the equation (9) and x (which actually uses the motor current) is made as such a new feedback term as shown in FIG. 6. That is, the first and second terms in the equation (8) are used as the control operations of the speed control device Gc, the third term is divided with use of the equation (10), the first term in the equation (10) is used by adding to an output of the speed control device Gc a value obtained by multiplying a signal of a differentiation (not containing noise due to the command value) of the speed command value $\omega p$ by JT/KT, and the third term T/Kta*x in the equation (10) is added to the output of the speed control device Gc as the feedback term from the motor current. The second term in the equation (10) is included in the operation of Gd by adding it to the equation (9). Through such conversion, the differentiation terms can be removed.

It is well known in a rolling mill drive system that a load torque d includes a torque based on a rolling load and a torque based on a tension acting on front and end parts of the rolling mill. That is, the following equation is established.

Figure 7:
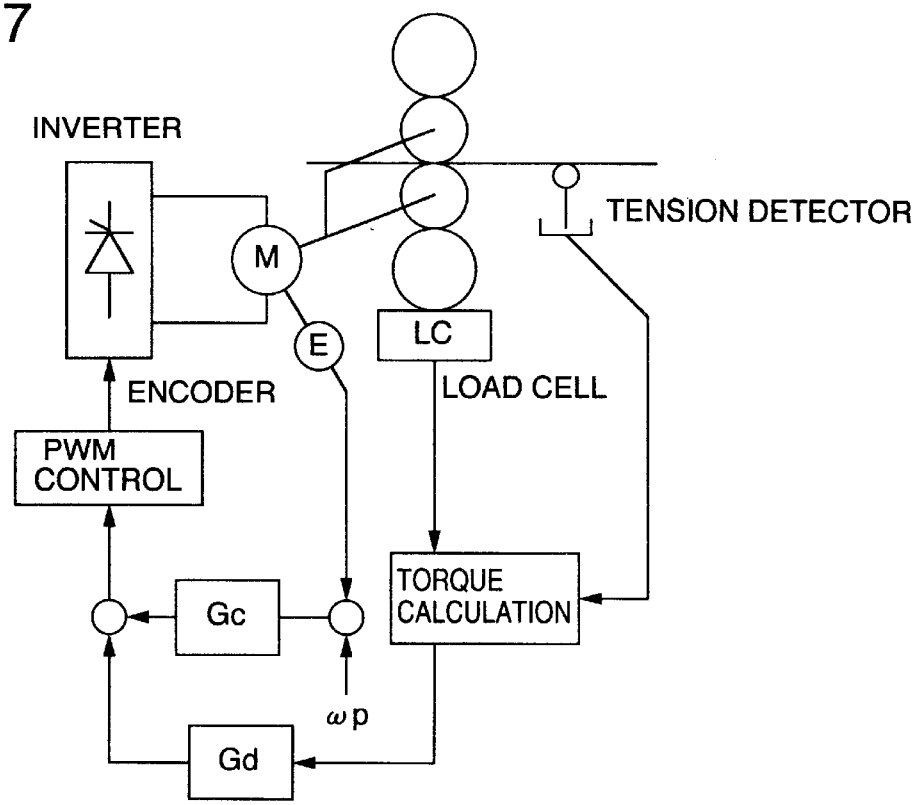
FIG. 7 shows a configuration example when the present invention is applied to control of a rolling mill.

[Equation 11]

$$d=A1 \cdot P+A2 \cdot (TB-TF) \quad \text{(Equation 11)}$$

where A1 and A2 denote coefficients. A rolling load P in the first term can be measured by a detector such as a load cell, and the torque based on P is a measurable disturbance. TB and TF in the above equation can be measured by a tension meter or can be calculated on the basis of the motor torque and rolling load, and can be applied to an input of the second control device as a measurable disturbance. An example of such a control system is shown in FIG. 7.

Figure 8:
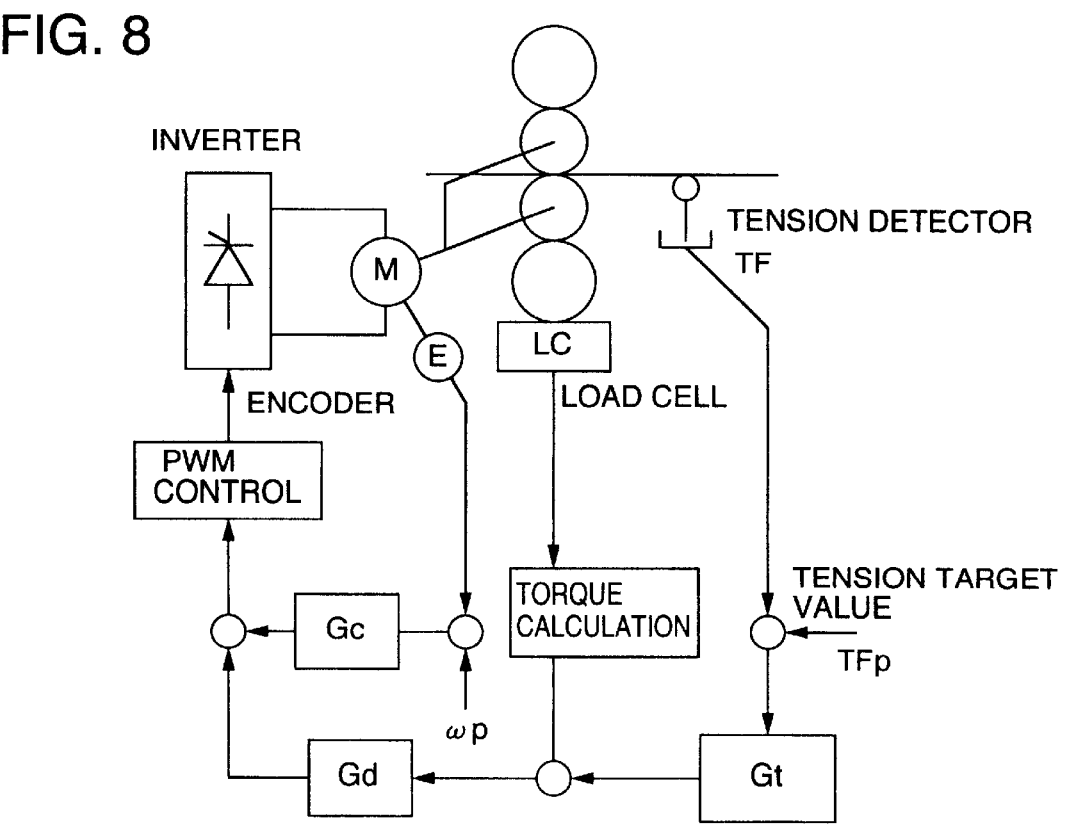
FIG. 8 is an embodiment in which a third control device is added as a development example of the present invention.
Figure 9:
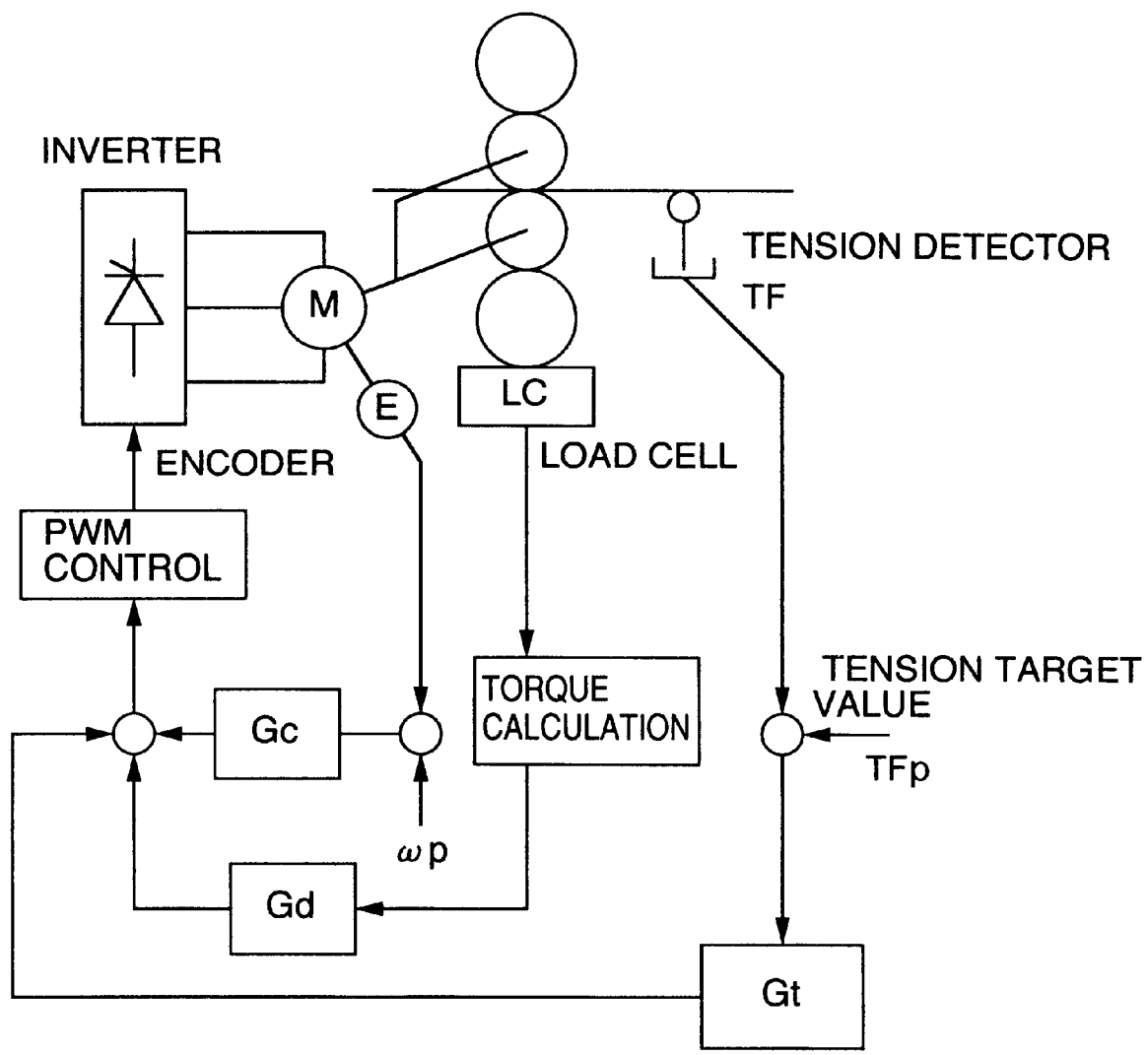
FIG. 9 is an embodiment corresponding to a development of FIG. 8.

In the rolling mill control, however, tension is usually a state quantity to be controlled. Thus tension control has been conventionally carried out to input a measured tension value to modify a speed target value. In the present invention, such tension control is carried out by dividing the input of the second control device into the rolling load P, i.e., the first term in the equation (11) and the tension TB or TF, i.e., one of quantities of the second term in the equation (11), inputting the tensions to the third control device, and adding an output of the third control device to the input of the second control device. In the case of the TF control for example, as shown in FIG. 8, a difference ΔTF between target and measured values of TF is input to the third control device, multiplied by the control operation transfer function Gt to obtain Gt·ΔTF as an output of the transfer function Gt, and Gt·ΔTF is used as TF in the equation (11). In this connection, Gt·ΔTF maybe obtained by directly adding these quantities to the first and second control devices as shown in FIG. 9. Design of the Gt operation transfer function is carried out in the form of the above equation (3) so that, after the first and second control devices are designed, its system is included, and a transfer function from the tension target value to the actual tension value becomes coincide with a predetermined response transfer function.

Although the present invention has been detailed in connection with the motor control of the rolling mill, the present invention is not limited to the motor control, but can be applied with general versatility to a wide range of applications including under-pressure positioning control of the rolling mill, servo control of robot, XY recorder, etc., flow rate control in chemical process, voltage and frequency control of power, and autovehicle engine control.

In the present invention, the operation may be digitally carried out without any problem.

There can be provided a control system which can clarify correlations between control variables and control devices, can control a load disturbance at a high speed and accurately while performing target-value following (constant) control to a main control variable, and can be suitably applied to control of such a control system as to require control of a plurality of states especially one operation quantity. Further, since the shares of the control devices are clear, system adjustment can be facilitated. In addition, since the control device unnecessary as a control function can be removed regardless of the other control devices and since the control devices can be designed with the predetermined response transfer functions given, the system can be made excellent in expandability and improbability.

What is claimed is:

1. A control system for determining a control function for a control device on the basis of a transfer function of an object to be controlled and for adjusting an operation quantity of an object to be controlled in accordance with the determined control function, wherein control function of a first control device is determined so that a one-cycle transfer function of the object to be controlled and the first control device coincides with a predetermined first transfer function, a control function of a second control device is determined, in a closed loop control system including the object to be controlled and the first control device, so that a transfer function from a disturbance applied to the object to be controlled to a state variable of a point at which the disturbance is applied to the object to be controlled, and a sum signal indicative of a sum of outputs of the first and second control devices is used as an operation quantity of the object to be controlled.

2. A control system as set forth in claim 1, wherein a differentiating operation in the control operation in each of the control devices is converted, based on a relationship of the transfer function of the object to be controlled, to a state quantity having a differentiation relationship with the corresponding state quantity to form another operation loop and not to directly perform the differentiating operation.

3. A control system as set forth in claim 1, wherein when a differentiating operation term is included in an operation function, a first state quantity as an input of the differentiating operation term is converted to a second state variable having a differentiation relationship with the first state variable from a relationship of the transfer function of the object to be controlled to convert the differentiating operation to proportional or integrating operation.

4. A control system as set forth in claim 1, wherein a state of the disturbance of the object to be controlled is detected or estimated from an external observable state value and input to said second control device.

5. A control system as set forth in claim 1, wherein said second control device includes a third control device for making a difference between part of a plurality of disturbance variables input and a reference value to perform proportional or intergrating operation over the difference wherein the output of said third control device is coupled to the output or input of said second control device.

6. A control device for controlling a rotational speed of a motor as with use of a terminal voltage of the motor as an operation quantity, said control system comprising:

a first control device for receiving a difference between target and detected values of the rotational speed with use of a transfer function from the terminal voltage to the rotational speed and for outputting said terminal voltage; and a second control device for receiving a load torque applied to the motor and adjusting said terminal voltage so that a current of the motor follows said load torque.

7. A control device as set forth in claim 6, wherein a transfer function of the first control device is designed so that a closed loop transfer function (one-cycle transfer function) found from a transfer function of the motor and from the transfer function of the first control device coincides with a predetermined transfer function.

8. A control device as set forth in claim 6, wherein a transfer function of the second control device is designed so that a response from the load torque to the motor current coincides with a predetermined response transfer function on the basis of the closed loop transfer function of the transfer function of the first control device and a transfer function of an object to be controlled.

9. A control device as set forth in claim 8, wherein in an object in which the load torque as an input of the second control device in claim 8 is made up of a plurality of external variables, a part of the external variables is detected or estimated and input to the second control device, an output of a third control device for performing proportional or integrating operation over a difference between pre-given reference or average value of another part of the external variables and a detected or estimated value thereof is added to the input of the second control device.

10. A control device as set forth in claim 9, wherein the detected or estimated value of a part of the external variables is input to the second control device, and the output of the third control device, which operates on a difference between the other of the external variables detected or estimated and a reference of the external variables, is added to the output of the second control device.

11. A control system for a drive control device of a rolling mill, wherein a first control device is a speed control device for receiving a command value of a speed of a motor and a detected or estimated value of an actual speed, a second control device is a torque control device for receiving a load torque depending on a rolling load and outputting a terminal voltage of the motor, and a third control device is a tension control device for receiving a difference between target and detected values of a tension and for outputting a tension torque command as an input command of the second control device or the motor terminal voltage as a second output.

12. A control device for controlling a rolling mill with a motor, comprising a first control device for receiving a difference between command and detected values of a roll-gap position and outputting an operation quantity for a motor, and a second control device for receiving a rolling load and correcting the operation quantity for the motor with a signal proportional to the polling load, wherein the outputs of said first and second control devices are added to each other for obtaining the operation quantity.

13. A control device wherein a first control device is designed from its response function and a transfer function of an object to be controlled so that a response of the first control device becomes a predetermined response function, a second control device is designed from a transfer function of the control device including the first control device and the object to be controlled and from the predetermined response function of the second predetermined response function, a third control device is designed from a closed-loop transfer function obtained from the first and second control devices and the object to be controlled and from a third response function, wherein outputs of the first, second and third control devices are added together to be used as an operation quantity of the object to be controlled.

14. A control device wherein a first control device is designed from its response function and a transfer function of an object to be controlled so that a response from an object to be controlled becomes a predetermined function, a second control device is designed from a closed-loop transfer function of the object to be controlled and a second predetermined response function, and wherein a third control device inputs a difference between part of detected variables and a reference for the variables and outputs a part of second input variables by operation, wherein the output of the first control device is added to the output of the second control device as an operation quantity of the object to be controlled.

15. A control apparatus in a control device having n state variables, wherein a first control device is a control device for a control quantity as a final stage output, an i-th control device is designed from control devices until an (i−1)-th control device already designed and from an object to be controlled so that a response of an i-th state variable becomes a predetermined response function, outputs of the n control devices are added together and used as an input operation quantity of the object to be controlled.

16. A control method for determining a control operation function of a control system from a transfer function of an object to be controlled and for adjusting an operation quantity of the object to be controlled according to the determined control function, wherein a control function of a first control device is determined so that a closed-loop transfer function of a control system including the object to be controlled and the first control device coincides with a predetermined first transfer function, a control function of a second control device is determined in a closed loop control system including the control system and the first control device so that a transfer function from a disturbance applied to the object to be controlled to a state variable of a point at which the disturbance is applied to the object to be controlled coincides with a second transfer function, and a sum signal indicative of a sum of outputs of the first and second control devices is used as an operation quantity of the object to be controlled.

* * * * *